(12) United States Patent
Urban et al.

(10) Patent No.: US 6,680,693 B2
(45) Date of Patent: Jan. 20, 2004

(54) METHOD AND APPARATUS FOR AUTOMATICALLY TRACKING THE SUN WITH AN OBJECT

(75) Inventors: Marek W. Urban, Hattiesburg, MS (US); James M. Evans, Hattiesburg, MS (US)

(73) Assignee: The University of Southern Mississippi, Hattiesburg, MS (US)

(*) Notice: Subject to any disclaimer, the term of this patent is extended or adjusted under 35 U.S.C. 154(b) by 0 days.

(21) Appl. No.: 10/092,698

(22) Filed: Mar. 7, 2002

(65) Prior Publication Data

US 2003/0169200 A1 Sep. 11, 2003

(51) Int. Cl.[7] .............................................. H04B 7/185
(52) U.S. Cl. .............................. 342/357.06; 342/357.15
(58) Field of Search ........................... 342/352, 357.06, 342/357.07, 357.15; 701/213, 222

(56) References Cited

U.S. PATENT DOCUMENTS

| | | | |
|---|---|---|---|
| 5,574,465 A | 11/1996 | Okada | 342/352 |
| 5,838,330 A | 11/1998 | Ajima | 345/427 |
| 5,919,314 A * | 7/1999 | Kim | 136/246 |
| 6,043,778 A | 3/2000 | Froeberg et al. | 342/357.14 |
| 6,192,196 B1 | 2/2001 | Keller | 396/20 |
| 6,304,376 B1 | 10/2001 | Baun et al. | 359/429 |
| 6,422,509 B1 * | 7/2002 | Yim | 244/3.21 |

* cited by examiner

Primary Examiner—Dao Phan
(74) Attorney, Agent, or Firm—Howrey Simon Arnold & White LLP

(57) ABSTRACT

A method and apparatus are disclosed to track the position of the sun and direct an object to the direction of the sun, regardless of weather conditions or geographical location, among other disruptive or interrupting factors. The object may include a solar collector, solar cell, or test panel, among other possible devices or applications requiring near continuous exposure to rays of the sun. The apparatus uses a GPS device to determine the position of the object on the earth. The apparatus includes a controller operatively coupling to the GPS device. The controller calculates the relative position of the sun with respect to the object. The controller operatively couples to a positioning system. The positioning system includes a first drive and a second drive coupled to the object. Commands from the controller operate the positioning system to articulate the object and automatically direct it towards the relative position of the sun.

33 Claims, 4 Drawing Sheets

METHOD AND APPARATUS FOR AUTOMATICALLY TRACKING THE SUN WITH AN OBJECT

FIELD OF THE INVENTION

The present invention relates generally to a method and apparatus for automatically tracking the sun with an object. More particularly, the present invention relates to a method and apparatus using the Global Positioning System (GPS) and ephemeris data for automatically tracking the sun regardless of location on the earth, weather conditions, or intensity of electromagnetic radiation from the sun, and for automatically directing an object towards the relative position of the sun to expose the object to a substantial amount of sunlight.

BACKGROUND OF THE INVENTION

Certain devices must follow the sun during daytime hours to expose a panel to the rays of the sun. The panel may include a solar collector, solar cell, or test panel, which is moved to face the sun as it travels across the sky. Typically, photo-sensors are used to direct the panel towards the sunrays as the sun moves across the sky. The photo-sensors use the sun's rays to control mechanical motion of the device and position the panel to the rays of the sun.

Prior art devices using photo-sensors are sensitive to variations in weather and specifics of the geographic location of the device. For example, panels used to test the exposure of paint samples to the rays of the sun may be conducted at a location where the sun shines most of the year. Thus, the location provides an easier target for the photo-sensors to follow the sun. Unfortunately, testing the exposure of the paint samples to sunlight may not always lend itself to being performed where the sun provides a substantial amount of intensity throughout the year. It is therefore desirable that a device tracks the position of the sun and directs a panel to the direction of the sun regardless of weather conditions or geographical location, among other disruptive or interrupting factors.

The present invention is directed to overcoming, or at least reducing the effects of, one or more of the problems set forth above.

SUMMARY OF THE INVENTION

One aspect of the present invention provides an apparatus for automatically directing an object to the sun, regardless of location of the object on the earth, weather conditions near the object, or intensity of electromagnetic radiation from the sun, among other disruptive or interrupting factors. The object may include a test surface, solar collector, and solar cells, among other possible devices or applications requiring near continuous exposure to the electromagnetic radiation of the sun. The apparatus uses a GPS device to acquire the position of the apparatus on the earth. The apparatus includes a controller operatively coupled to the GPS device. The controller calculates the relative position of the sun with respect to the object. The controller is operatively coupled to a positioning system. The positioning system is mechanically or electrically coupled to the object. Commands from the controller operate the positioning system to articulate the object. The object is automatically directed towards the relative position of the sun to follow the travel of the sun across the sky.

The foregoing summary is not intended to summarize each potential embodiment, or every aspect of the invention disclosed herein, but merely to summarize some aspects of the present invention, among others.

BRIEF DESCRIPTION OF THE DRAWINGS

The foregoing summary, a preferred embodiment and other aspects of the present invention will be best understood with reference to a detailed description of specific embodiments of the invention, which follows, when read in conjunction with the accompanying drawings, in which.

Figure 1:
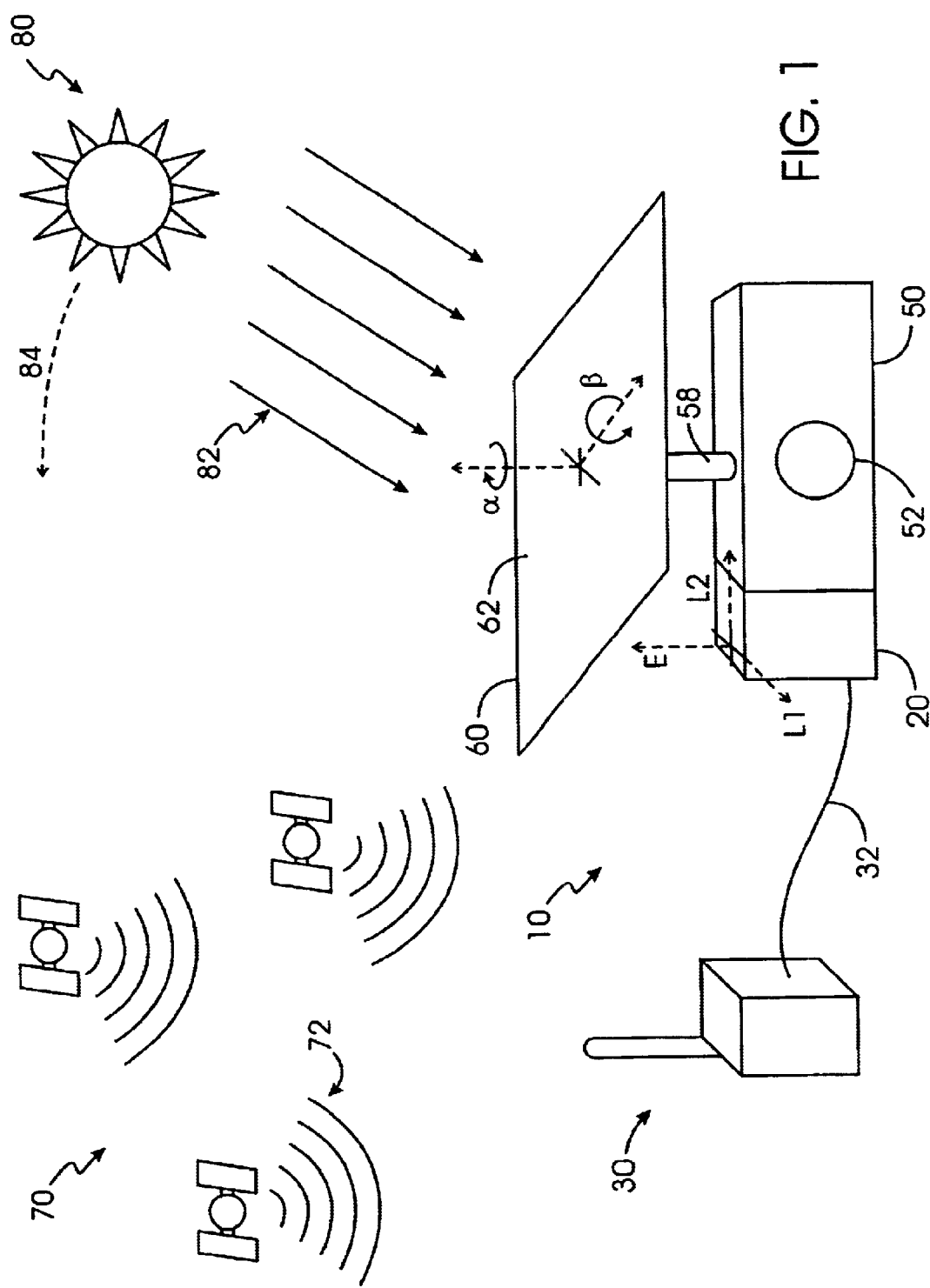
FIG. 1 illustrates an apparatus for tracking the sun and directing a surface of a panel to electromagnetic radiation of the sun in accordance with the present invention.

While the invention is susceptible to various modifications and alternative forms, specific embodiments are shown by way of example in the drawings and are described in detail below. However, it should be understood that the invention is not intended to be limited to the particular forms disclosed. Rather, the invention is to cover all modifications, equivalents, and alternatives falling within the scope of the invention as defined by the appended claims.

DETAILED DESCRIPTION OF THE INVENTION

Referring to FIG. 1, an apparatus 10 for tracking the sun and positioning a panel toward the sun is illustrated in accordance with the present invention. The apparatus 10 includes a controller 20, a global positioning system (GPS) device 30, a orientation device (not shown), a positioning system 50, and a panel 60. The panel 60 has a surface 62 intended for exposure to the rays or electromagnetic radiation 82 of the sun 80. The apparatus 10 tracks the relative position of the sun 80 and orients or directs the panel 60 toward the sun 80 to maximize exposure of the surface 62 to the sunrays 82. The apparatus 10 directs the panel 60 to the sun 80, regardless of the weather conditions, the geographical location, or other disruptive or interrupting factors.

The controller 20 can include, among other components, a processor, a storage device or database, and an I/O device or manual interface. The controller 20 may have the usual ROM and RAM operatively connected to the I/O device. The RAM may be provided with a database containing ephemeris data of the sun. The GPS device 30 operatively couples to the controller 20 of the apparatus 10. The GPS device 30 can be an integral component of the apparatus 10. Alternatively, the GPS device 30 can be an independent unit removably coupling to the apparatus 10. The GPS device 30 typically includes a GPS receiver and an antenna, among other components.

Data or information obtained with the GPS device 30 is provided to the controller 20. The data from the GPS device 30 can be directly communicated to the controller 20 through an electrical interface or can be manually input to the controller 20 by an operator with a user interface. For example, the data provided to the controller 20 by the GPS device 30 can be configured with a National Marine Electronics Association (NMEA) interface. The NMEA interface is a well-recognized interface protocol and may be used to communicate location information directly to the controller 20.

In one embodiment, for example, the GPS device 30 electronically communicates data and information to the controller 20 via a cable 32. In another embodiment, the electronic communication between the GPS device 30 and controller 20 can include wireless communication. In yet another embodiment, an operator can obtain data with the GPS device 30 and can manually input the data using a manual user interface (not shown) of the controller 20.

The positioning system 50 is operatively coupled to the controller 20. The positioning system 50 includes a drive 52. The drive 52 includes one or more actuators or motors. A coupling or articulating connection 58 connects the drive 52 with the panel 60 and transfers motion from the drive 52 to the panel 60. Controlled by the controller 20 and moved by the positioning system 50, the panel 60 can be articulated with respect to the apparatus 10 and can be oriented to face the surface 62 towards the calculated position of the sun 80, as described below.

The panel 60 is a device or application requiring nearly continuous repositioning towards the sun 50. For example, the panel 60 can include a test surface, solar cells, a solar collector, or devices or applications requiring nearly continuous repositioning towards the sun 50. In one embodiment, among others, the surface 62 of the panel 60 includes one or more paint samples for testing their degradation due to exposure to electromagnetic radiation of the sun. In an effort to expose the test surface 62 to a substantial amount of sunlight, the apparatus 10 is used direct the panel 60 to the sun regardless of the weather conditions or geographic location. The ability to precisely control the focus of the sunlight upon the panel 60 may produce an accelerated testing condition far exceeding instruments known to date.

Figure 2:
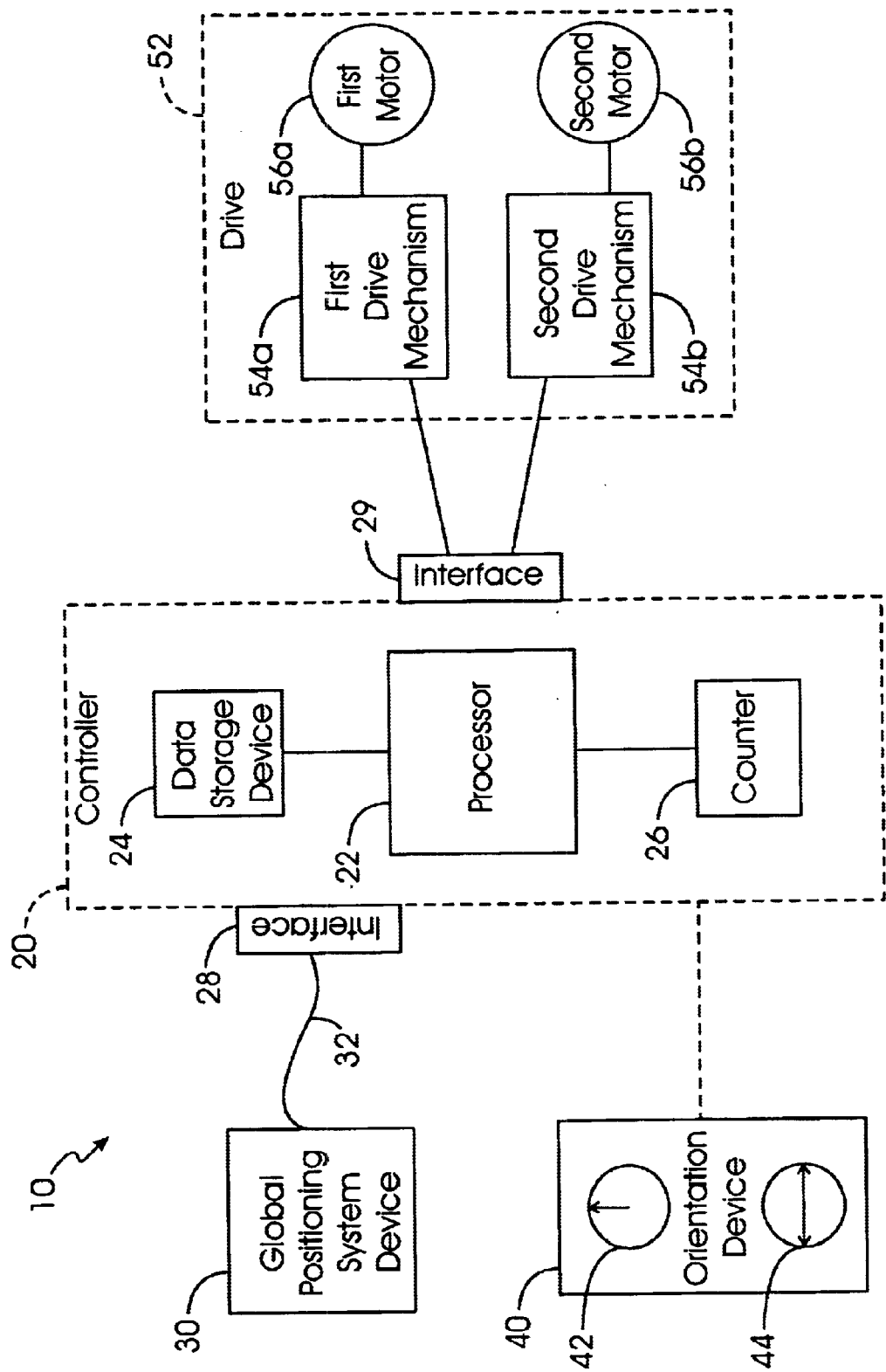
FIG. 2 schematically illustrates components of the apparatus in FIG. 1.

Referring to FIG. 2, components of the apparatus 10 of FIG. 1 are schematically illustrated. The apparatus 10 includes the controller 20, the GPS device 30, the orientation device 40, and the drive 52. The controller 20 includes a processor 22, a data storage device 24, and a clock or counter 26, among other components. The processor 22 can be a standard computer microprocessor, and the data storage device 24 can be a hard drive, a non-volatile storage medium, a flash memory, tape, CD-ROM, or DVD. In one embodiment, the controller 20 is a lap top computer.

The processor 22 is programmed to acquire, calculate, store, and send data in accordance with the present invention. The programmed processor 22 communicates with the GPS device 30 through a first interface 27 and communicates with the positioning system 50 through a second interface 29. A suitable program for programming the processor 22 can be loaded on to the storage device 24. The program can be a commercially available software package capable of accessing and storing data in databases, acquiring data from devices, performing calculations on data, and sending signals to devices. For example, MATLAB and LABVIEW are commercially available software packages that can be programmed to perform the functions and operations of the controller 20 described herein.

The data storage device 24 includes one or more databases for storing data for use in calculations as described below. For example, the data storage device 24 can include a first database storing ephemeris data of the sun and can include a second database storing the spatial orientation of the panel.

The processor 22 is operatively coupled to the first interface 28. The processor 22 acquires location and time, measurements from the GPS device 30. The programming of the processor 22 includes one or more algorithms or functions. For example, one algorithm or function determines position information of the sun for the time measurement based on the location and the bearing of the apparatus 10. Another algorithm of function calculates movements required for the panel to face the calculated position information of the sun.

In one embodiment, the GPS device 30 is an independent unit operatively coupled to the controller 20. For example, the GPS device 30 can be a commercially available unit, such as a unit manufactured by Garmin International or a MAGELLAN unit manufactured by Thales Navigation. The GPS device 30 connects to the first interface 28 of the controller 20 via the cable 32, which can be an RS-232 cable. The controller 20 and GPS device 30 use a standard interface and protocol for communication between instruments, such as the National Marine Electronic Association (NMEA) interface and standards.

The orientation device 40 is used for providing the panel with an initial, zero orientation at the location with respect to the surrounding horizon and sky. The orientation device 40 includes a bearing device 42 for providing a bearing or initial azimuth with respect to a reference, such as magnetic north, at the location. In addition, the orientation device 40 includes a leveling device 44 for providing a level or initial altitude with respect to a plane, such as the horizon or gravitational center of the earth, at the location. The orientation device 40 can include a compass, a sight, a level, or other device for manually orienting the apparatus 10 or panel 60. Alternatively, the orientation device 40 can include an electronic compass or device for automatically obtaining the bearing or level, such as another GPS unit.

In one embodiment, the orientation device 40 includes a magnetic compass. The magnetic compass is visible to an operator and is used to orient the apparatus and/or panel towards magnetic north. In another embodiment, the orientation device 40 includes an electronic compass operatively coupled to the controller 20. The electronic compass can provide the bearing of the apparatus 10 for processing by the controller 20, as described below.

The controller 20 is operatively coupled to the positioning system 50 through the second interface 29. The positioning system 50 orients the panel 60 with respect to the position of the sun 80 in an effort to maximize exposure of the surface 62 to the sunrays. In a preferred embodiment, the drive 52 includes at least two drive mechanisms 54a and 54b and includes at least two actuators or motors 56a and 56b.

Figure 4:
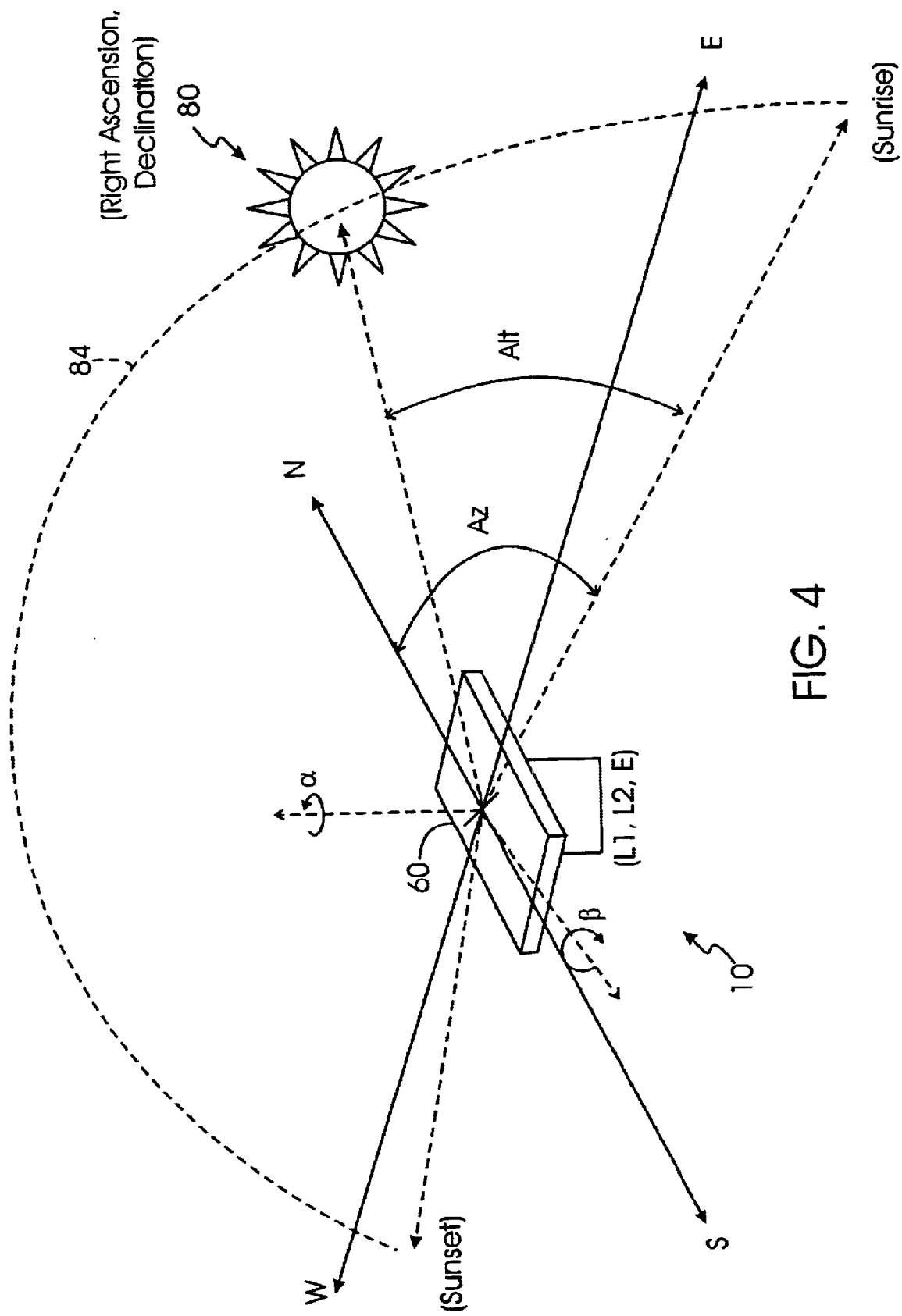
FIG. 4 illustrates the tracking of the sun relative to the apparatus and panel.

In one embodiment, the actuators 56a and 56b are stepper motors. The first and second stepper motors 56a and 56b articulate the panel 60 about different axes. For example, as shown in FIGS. 1 and 4 and described in more detail below, the panel 60 can be articulated about an azimuth axis ($\alpha$) and an altitude axis ($\beta$). The first stepper motor 56a articulates the panel about the azimuth axis ($\alpha$). The second stepper motor 56b articulates the panel of the apparatus about the altitude axis ($\beta$).

Each stepper motor 56a and 56b is connected to one of the drive mechanisms 54a and 54b, which are stepper motor drivers. The stepper motor drivers 54a and 54b are operatively coupled to the controller 20 through the interface 29. The stepper motor drivers 54a and 54b each include circuitry connected to a power supply (not shown). The circuitry receives pulses or digital signals from the controller 20 and supplies increments of power to the stepper motor to advance the motor a number of steps as specified. The stepper motor drivers 54a and 54b can include a counter or a power converter, among other necessary electronics.

The power source can be a battery or can be commercially available power. For orienting test panels coated with a treated surface, the stepper motors 56a and 56b may require a 12-volt power supply with DC current, for example. The stepper motors 56a and 56b may be chosen to provide approximately 0.5 horsepower each to move a test panel weighing approximately 3 lbs.

Figure 3:
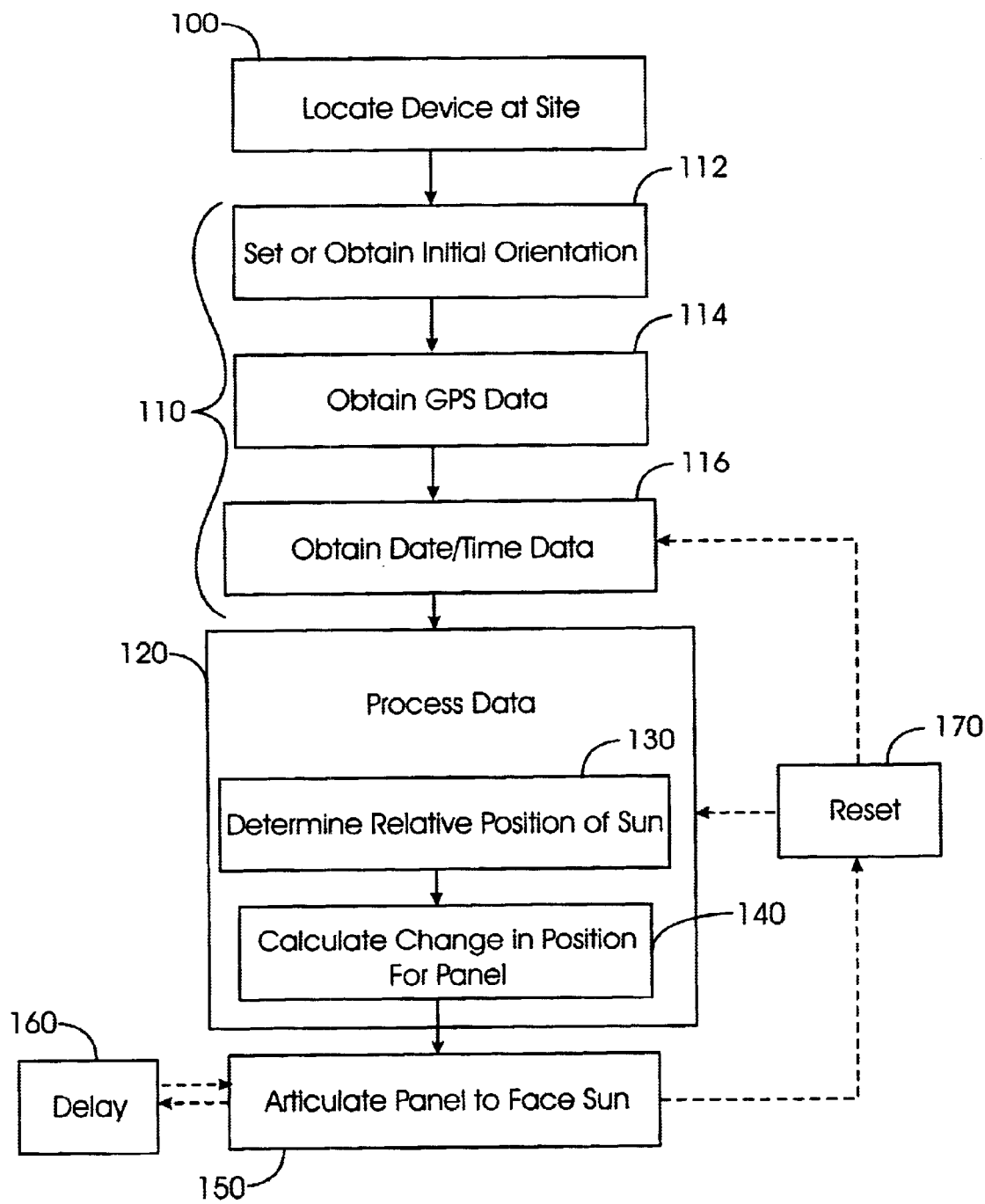
FIG. 3 illustrates a method for-tracking the sun and exposing a surface of a panel the electromagnetic radiation of the sun using the apparatus of FIGS. 1 and 2.

Referring to FIG. 3, where reference is concurrently made to components of the apparatus 10 in FIGS. 1 and 2, a flow diagram of steps for operating the apparatus 10 is illustrated in accordance with the present invention. It is understood that the steps may be performed in a different order than explicitly presented herein. It is also understood that some of the steps may not be necessary depending on the particular embodiment and components of the apparatus 10. Moreover, it is understood that additional steps may be either implied or inherent and are omitted herein for the sake of brevity, knowing that one skilled in the art will readily recognize their applicability with the benefit of the present disclosure.

The apparatus 10 with panel 60 is placed at a location (Step 100). Instead of using photo-sensors or any other device relying on sunlight to follow the movement of the sun 80, the controller 20 and the global positioning system (GPS) device 30 are used to track the position of the sun 80 with respect to the panel 60. The relative position of the sun 80 is a function of several variables, including the spatial orientation of the panel 60, the geographic location of the panel 60, the date of the year, and the time of day. Accordingly, the controller 20 obtains a plurality of data (Step 110) to determine these variables.

Because the panel 60 must be moved to track the movement of the sun in the sky, the controller 20 must know the spatial orientation of the panel 60 with respect to the earth and sky. In other words, the controller 20 requires that an initial orientation of the panel 60 be set or obtained to provide a zero reference from which to calculate changes or movements with respect to the earth and sky. For the controller 20 to orient or direct the panel 60 towards the sun 80, a bearing or initial azimuth of the panel 60 with respect to a reference, such as true north, must be known. In addition, a level or initial altitude of the panel 60 with respect a reference, such as the horizon or center of earth's gravity, must be known. Therefore, the initial spatial orientation of the panel 60 is set or obtained (Step 112).

The spatial orientation ($\alpha$, $\beta$) of the panel 60 can be initially set to a predetermined orientation when situating the apparatus 10 at the location. Subsequent spatial orientations of the panel 60 can be stored in a database of the data storage device 24 and can be accessed by the processor 22. Encoders or counters can be used to measure and store the spatial orientation of the panel 60 in the database of the data storage device 24.

The orientation device 40 can be used to set or obtain the bearing or initial azimuth and the level or initial altitude of the panel 60. For example, the panel 60 can be initially articulated to face North and perpendicular to the level of the horizon, assuming that the apparatus 10 has been positioned substantially level on the ground with an appropriate leveling device.

In another example, the panel 60 can have a manual or electronic leveling device requiring the panel 60 to be articulated at a predetermined plane. For example, the leveling device (not shown) on the panel 60 can require that the panel 60 be positioned substantially level to the plane of the horizon with one end pointing substantially towards magnetic north when initially positioning the apparatus at the location.

In one embodiment of the present invention, among others, the bearing or initial azimuth and level or initial altitude are manually provided by an operator orienting the panel 60 at the location. For example, the orientation device 40 can include a magnetic compass and a visual level. The operator can be required to orient the panel 60 so that it is directed towards magnetic north at a certain planar orientation.

In another embodiment, the bearing and level are automatically provided to the controller 20. The level of the panel 60 can be obtained from an electronic level device capable of indicating an angle of the panel about an axis. The bearing or initial azimuth can be obtained with multiple GPS readings from one or more GPS devices 30. Alternatively, the orientation device 40 can include an electronic compass or other suitable device for automatically determining the bearing or initial azimuth of the panel 60. The electronic compass 40 can include magnitoresistive sensors, which are able to electrically resolve the bearing using the earth's magnetic field to an accuracy of approximately ½-degree and with a resolution of about 0.1 degrees.

The magnetic field of the earth has an intensity of about 0.5 to about 0.6 gauss and includes a component parallel to the earth's surface that always points towards magnetic north. The component of this field that is parallel to the earth's surface is used to determine the bearing with the electronic compass 40. The magnitoresistive sensor may be constructed of thin strips of magnetic film whose electrical resistance properties vary with a change in an applied magnetic field. Magnitoresistive sensors have a well-defined axis of sensitivity, respond to changes in an applied magnetic field as little as 0.1 milligauss, have a response time of less than 1 microsecond and are generally commercially available as packaged integrated circuits.

The electronic compass 40 can be used to initially orient the panel 60 towards a known reference, such as magnetic north. Alternatively, the electronic compass 40 can measure the bearing of the panel 60 with respect to a known reference when the apparatus is positioned arbitrarily at the location. Correction for the arbitrary bearing can then be made when performing calculations that are based on the known reference.

The bearing obtained by the manual or electronic compass, however, can be inexact due to variations in the earth's magnetic field and magnetic deviation due to surrounding metal and electrical panels and devices. As is known, true north uses the North Pole as a 0° reference, whereas magnetic north uses the magnetic north pole, which lies in northern Canada. Therefore, some variation in the bearing made with the orientation device 40 can result when the reference is magnetic north. The magnetic variation for the particular location of the apparatus can be overcome using a model of the earth's magnetic variation and the location of the panel 60 on the earth obtained in step 114 below. Thus, the controller 20 can include an algorithm or function to correct for any known discrepancy in the bearing of the apparatus.

To track the sun, the controller 20 requires the location of the panel 60 on the earth and obtains GPS data from the GPS device (Step 114). For example, the location can include the latitude, the longitude, and perhaps the elevation of the panel 60 on the earth. Besides latitude and longitude, other coordinate systems can be used such as Universal Transverse Mercator/Universal Polar Stereographic (UTM/UPS) or Military Grid Reference System (MGRS). Furthermore, the controller 20 requires the time and date for the given location measurement.

The GPS device 30 is capable of providing a near precise location of the panel 60 on the earth. In this way, the location of the panel 60 is used in conjunction with the controller 20 to track the relative position or travel of the sun 80 with respect to the panel 60. The location of the panel 60 is obtained with the GPS device 30 from a satellite-based navigation system known as the US Global Positioning System or GPS.

The Global Positioning System and techniques for obtaining location or position information from the satellite signals are known in the art. Reference to global positioning system (GPS) herein refers to a Global Positioning System, to a Global Orbiting Navigation System, or to any other compatible satellite based system, that provides information by which an observer's position and/or the time of observation can be determined. Although the present embodiment is described with reference to the use of satellites of the US Global Positioning System, any of a number of systems, such as NAVSTAR, GLONASS, or LORAN can also be used.

The GPS device 30 is equipped with a GPS receiver and antenna to obtain the necessary data for determining the location of the panel 60. The GPS device 30 receives position signals or ephemeredes broadcast from a constellation of satellites 70 of the US Global positioning system (GPS). The GPS device 30 receives signals from a plurality of GPS satellites 70 at the same time. The signals received by the GPS device 30 can be processed directly by the GPS device 30. The GPS device 30 includes a function to determine the present location of the panel 60 and to obtain the time corresponding to the present position based on a positioning method using GPS signals.

Based on a difference between time information sent by each GPS satellite 70 and a time of an internal clock built in the GPS device 30, i.e. a time difference of emission and arrival of a radio wave by the GPS satellite 70 and the GPS device 30, a distance between the GPS device 30 and each of the GPS satellites 70 is calculated. Then, based on the plurality of distances between the GPS device 30 and the GPS satellites 70 at the same point in time, the position of the device is obtained at a certain point in time.

When the signals transmitted by only three GPS satellites are used to determine the location of the panel 60, longitude, latitude, and time can be obtained. The elevation may be known, measured with an altimeter, or assumed as an average value. In one embodiment to determine a more accurate location of the panel 60, the GPS device 30 can obtain ranging signals from four or more of the currently existing twenty-eight orbiting GPS satellites 70. When the GPS signals are received from at least four GPS satellites, longitude, latitude, time, and elevation can be obtained.

The GPS satellites 70 are owned and controlled by the US Department of Defense, which has the prerogative to degrade the accuracy for purposes of national defense by what is called "Selective Availability" or commonly known as "SA." SA is now turned "off," and the accuracy of GPS readings is much better than in the past. For civilian users (e.g., non-military) the accuracy of the position may be within 10 meters for about 95% of the time and within 5 meters for about 60%. A commercial GPS device typically can be capable of 100 feet of accuracy. These levels of accuracy can be sufficient for the apparatus 10 to track the position of the sun 80 and direct the panel 60 to the sun 80 for optimum exposure of the surface 62 to the sunlight.

To achieve additional accuracy of the location of the panel 60, the GPS device 30 can be augmented by signals from the Federal Aviation Administration's (FAA) Wide Area Augmentation System (WAAS). Although primarily designed to assist in the navigation of commercial aircraft, the WAAS signals are available to all interested users. The GPS device 30 may receive basic GPS ranging signals from four or more GPS satellites 70 as described above. In addition, the GPS device 30 can also receive a WAAS correction signal from an Inmarsat III geostationary satellite. This signal provides the GPS device 30 with correction data to remove errors caused by atmospheric delay, ephemeris errors, selective availability, and other sources. The WAAS signal uses the same L1 frequency (1575.52 MHz) that the GPS satellites 70 use, thus simplifying the design of the GPS device 30 and keeping costs down while providing improved accuracy.

To improve accuracy, the GPS device 30 can be augmented by a local area differential GPS system that broadcasts locally computed differential corrections to the GPS device 30 in the vicinity. In this implementation, the GPS device 30 can receive GPS ranging signals from a minimum of four GPS satellites 70 as described above. GPS signals are also received by the antenna of a ground reference station. The reference station computes its location using GPS signals and compares its GPS-derived location to its actual surveyed location. The difference between these two locations represents the total GPS error. The reference station then broadcasts correction signals via antenna to all of the GPS devices 30 in the vicinity. The GPS device 30 is then able to use these correction signals to remove the GPS error components and substantially improve their location accuracy.

The controller 20 then obtains date/time data (Step 116). Date and time are also available from GPS so that the controller 20 may obtain the date and time using the GPS device 30. Each GPS satellite 70 maintains the exact time in UTC (Universal Time Coordinated, formerly Greenwich Mean Time). Because GPS satellites 70 transmit highly accurate time measurements, the time measurements received with the GPS device 30, whenever available, can be used as the time data for the controller 20.

Typically, broadcasts from GPS satellites 70 may also include clock error, which may be used to correct the broadcast time. To obtain the date and time, the controller 20 can alternatively sample the internal clock 26 to determine the time and date. The time and date indicated by the internal clock 26 can also be updated as necessary using the GPS device 30. The bearing and location of the device along with the current time and date can all be stored within a database of the data storage device 24 of the controller 20.

The controller 20 then processes the initial orientation, location, time and date (Step 120). The controller 20 calculates the relative position of the sun 80 with respect to the panel 60 (Step 130). In one embodiment, the controller 20 compares the location of the panel 60 to solar ephemeris data, which is stored in a database of the data storage device 24. The ephemeris data can be in the form of algorithms for celestial prediction or formulae used for navigation. In addition, the ephemeris data can be in the form of lookup tables based on such relationships.

Such algorithms, formulae, and tables for determining or predicting the position of the sun are well known in the art. The algorithms or formulae for predicting the position of the sun can be readily programmed by one skilled in the art for use by the controller 20. Alternatively, a number of commercially software programs are available for predicting the position of the sun and can be installed on the controller 20.

For example, *Astronomical Algorithms* by Jean Meeus is one source having algorithms for predicting the position or the rise and set time of the sun. It is possible for an algorithm to predict the sun's position within about 0.01 degrees (two percent of the solar diameter) by assuming a purely elliptical motion for the earth and ignoring perturbations from the moon and planets. Each calculation only requires evaluation of eleven low-order polynomial equations with a dozen trigonometric evaluations. Other algorithms, formulae, or tables providing more or less accuracy can be sufficient for use with the apparatus 10 of the present invention.

It is understood that differing coordinate systems can be used to represent the location of the panel 60 on the earth, the position of the sun 80 in the sky, and the orientation of the panel 60 with respect to the earth and sky. As best shown in FIG. 4, the location of the panel 60 can be characterized in a geographical coordinate systems, for example, longitude L1, latitude L2, and elevation E. The spatial orientation of the panel 60 can be a characterized in rectangular coordinate system or an altitude-azimuth coordinate system.

For example, the spatial orientation of the panel 60 in FIG. 4 is characterized by rotation about the azimuth axis ($\alpha$) and about the altitude axis ($\beta$). The position of the sun 80 may be characterized in a celestial coordinate system, such as right ascension and declination. To resolve the trigonometry between the coordinate systems, conversions for coordinate systems are well understood by those having skill in the art and can be computed using matrix transformations and rotation mathematics. Accordingly, the controller 20 can include mathematical algorithms or functions for converting between coordinate systems.

In one example of a calculation to determine the relative position of the sun 80 to the panel 60, the controller 20 searches the ephemeris data for position information or calculates position information of the sun for the date specified based on the location of the panel 60 on the earth. On the given day, the right ascension and declination of the sun can be obtained from the ephemeris data or calculated with an ephemeris formula. The times of the sunrise and sunset can also be obtained or calculated for the given day.

The right ascensions and declinations can be converted into an azimuth-altitude coordinate system (Az, Alt) relative to the bearing or initial azimuth of the panel 60, such as true or magnetic north. As best shown in FIG. 4, the travel 84 of the sun 80 can then be approximated as an arc of approximately 180-degrees. The travel 84 is characterized by changes in both the azimuth axis (Az) and the altitude axis (Alt) across the sky. These changes can be divided by the amount of time between the sunrise and the sunset to determine the rate, i.e., the number of degrees per hour, that the sun 80 will travel across the sky in relation to the panel 60.

After determining the travel 84 of the sun 80, the controller 20 then calculates the necessary changes in position for the panel 60 to follow the relative position of the sun 80 (Step 140). The articulation of the panel 60 is divided into movements or a plurality of commands, increments, or steps for each axis to match the rate and position of the sun's travel across the sky in relation to the panel 60. The controller 20 calculates a necessary increment, rotation, speed, time, and/or direction command for each of the actuators or motors of the drive 52.

In one embodiment, the commands can include signals corresponding to actuate motor rotational movement. The signals are sensed by an incremental encoder coupled to a motor of the drive 52. A record of the total movement of the motor is established and returned to the controller 20. As noted above, the drive 52 of the automated positioning system 50 can include two actuators or motors to articulate the panel 60 about the azimuth axis ($\alpha$) and the altitude axis ($\beta$). With the current spatial orientation ($\alpha$, $\beta$) of the panel 60 known, the controller 20 calculates the required movement of the panel 60 for each axis to track the motion of the sun 80. The controller 20 translates the amount for each axis into a command for each actuator or motor of the drive 52.

For example, the drive 52 can include two stepper motors 56a and 56b as discussed above in FIG. 2. The controller 20 calculates movements for each axis ($\alpha$, $\beta$) as commands for each stepper motor 56a and 56b. The stepper motors 56a and 56b have a predetermined number of steps or increments in their rotation, for example, 360 steps of 1-degree each. Based on the predetermined number of steps of each of the stepper motors 56a and 56b, the controller 20 can send signals to each stepper motor to match the rate and position of the sun's travel 84 across the sky. The signals can include one or more clock pulses, digital signals, or steps sent to the stepper drivers 54a and 54b of the stepper motors. Upon receiving the signals, the stepper driver advances the stepper motor an appropriate number of steps of the motor. Thus, the positioning system 50 con continuously position the panel 60 to face the surface 62 at the sun 80 (Step 150).

To follow the motion of the sun 80 during the day, the controller 20 can repeat the process in step 150 of repositioning the panel 60 towards the sun 80 after a predetermined delay or time interval (Step 160). The delay or time interval can be controlled by an internal clock in the controller 20, the GPS device 20, or an external source (not shown). The calculated commands or signals to the positioning system 50 are stored in the controller 50 and are sent after predetermined time intervals to reposition the panel 60.

In some implementations, especially the testing of paint panels, the apparatus 10 will most likely be located at the same location for an extended period. Consequently, the controller 20 will not necessarily need to obtain new bearing readings (Step 112) or GPS data (Step 114). If the apparatus 10 is intended to be periodically moved to different locations, the process can obtain new bearing readings (Step 112) and GPS data (Step 114) at appropriate intervals or when commanded to do so.

After sunset, tracking the sun's position beyond the horizon is obviated. The panel 60 can be provided with a maximum value for articulation about the axes ($\alpha$, $\beta$). At the maximum value of articulation, the repositioning of the panel 60 is ceased. Alternatively, the controller 20 can stop repositioning the panel 60 at a predetermined point in time, for example, at sunset. The controller 20 can then reset to face the surface 62 towards the sun 80 at sunrise on the next day (Step 170).

For example, the controller 20 can calculate the change in position for the panel 60 to face the sun 80 in step 150. If the change would move the panel 60 past a maximum value of articulation about one of the axis ($\alpha$ or $\beta$), the process resets itself to be eventually repositioned to face the sun 80 at sunrise (Step 170). The process can return to previous steps, such as obtaining date/time data (Step 116) or processing data (Step 120) as necessary.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. An apparatus for automatically tracking the sun regardless of location on the earth, weather conditions, or intensity of electromagnetic radiation from the sun, the apparatus comprising:
   an object for directing to the sun;
   a first device for acquiring an orientation of the object defined by a first axis and a second axis;
   a second device using a global positioning system and obtaining a location of the object on the earth and a time measurement;
   a positioning system coupled to the object and comprising:
      a first drive capable of articulating the object about the first axis, and
      a second drive capable of articulating the object about the second axis; and
   a controller operatively coupled to the first and second devices and operatively coupled to the position system, the controller comprising:
      a first function acquiring the location and the time measurement obtained with the second device,
      a second function determining travel of the sun in relation to the object based on the time measurement and the location of the object, and
      a third function calculating movements about each of the first and second axes based on the travel of the sun and the orientation of the object,
   wherein the controller automatically controls the first and second drives to articulate the object the calculated movements and automatically track the travel of the sun with the object.

2. The apparatus of claim 1, wherein the object comprises a panel for testing exposure of one or more samples to the electromagnetic radiation of the sun.

3. The apparatus of claim 1, wherein the object comprises a solar collector or a solar cell.

4. The apparatus of claim 1, wherein the first device comprises a level device for manually positioning the object at a predetemined angle on the first axis.

5. The apparatus of claim 1, wherein the first device comprises a level device operatively coupled to the controller for automatically acquiring an angle of the object on the first axis.

6. The apparatus of claim 1, wherein the first device comprises a compass for manually positioning the object towards a predetermined bearing on the second axis.

7. The apparatus of claim 1, wherein the first device comprises a compass operatively coupled to the controller for automatically acquiring a bearing of the object on the second axis.

8. The apparatus of claim 1, wherein the first device comprises a database operatively coupled to the controller, the database storing a current articulation angle of the first drive about the first axis and storing a current articulation angle of the second drive about the second axis.

9. The apparatus of claim 1, wherein the second device is an independent unit operatively coupled to the controller with a cable.

10. The apparatus of claim 1, wherein the first and second drives each comprise a stepper motor having a stepper motor driver operatively coupled to the controller.

11. The apparatus of claim 1, wherein the controller comprises a processor operatively coupled to a data storage device and having a program operating thereon.

12. An apparatus for automatically tracking the sun regardless of location on the earth, weather conditions, or intensity of electromagnetic radiation from the sun, the apparatus comprising:
   an object for directing to the sun;
   means for acquiring an orientation of the object defined by a first axis and a second axis;
   means for acquiring a location of the object on the earth with a global positioning system;
   means for acquiring a time measurement;
   means for determining travel of the sun in relation to the object based on the time measurement and the location;
   means for calculating movements about each of the first and second axes based on the travel of the sun and the orientation of the object; and
   means for articulating the object about the first axis and the second axis based on the calculated movements to automatically track the travel of the sun with the object.

13. The apparatus of claim 12, wherein the object comprises a panel for testing exposure of one or more samples to the electromagnetic radiation of the sun.

14. The apparatus of claim 12, wherein the object comprises a solar collector or a solar cell.

15. The apparatus of claim 12, wherein the orientation acquiring means comprises means for manually positioning the object at a predetermined angle on the first axis.

16. The apparatus of claim 12, wherein the orientation acquiring means comprises means for automatically acquiring an angle of the object on the first axis, the automatic acquiring means operatively coupled to the calculating means.

17. The apparatus of claim 12, wherein the orientation acquiring means comprises means for manually positioning the object towards a predetermined bearing on the second axis.

18. The apparatus of claim 12, wherein the orientation acquiring means comprises means for automatically acquiring a bearing of the object on the second axis, the automatic acquiring means operatively coupled to the calculating means.

19. The apparatus of claim 12, wherein the orientation acquiring means is operatively coupled to the articulating means and comprises:
   means for receiving current articulating angles of the object about the first and second axes, and
   means for storing the current articulation angles.

20. The apparatus of claim 12, wherein the location acquiring means comprises a global positioning system device operatively coupled to the apparatus with a cable.

21. The apparatus of claim 12, wherein the determining means comprises a program operating a processor, the processor operatively coupled to a data storage device having ephemeris data of the sun.

22. The apparatus of claim 12, wherein the articulating means comprises a controller automatically controlling a first stepper motor and a second stepper motor, the first stepper motor capable of articulating the object about the first axis, the second stepper motor capable of articulating the object about the second axis.

23. A method for automatically tracking the sun regardless of location on the earth, weather conditions, or intensity of electromagnetic radiation from the sun, the method comprising the steps of:
   a) acquiring an orientation of an object defined by a first axis and a second axis;
   b) acquiring a location of the object on the earth by using a global positioning system;

c) acquiring a time measurement;

d) determining travel of the sun in relation to the object based on the time measurement and the location;

e) calculating movements about the first and second axes for the object based on the travel of the sun and the orientation of the object;

f) articulating the object about the first axis and the second axis based on the calculated movements; and g) automatically tracking the travel of the sun with the object.

24. The method of claim 23, wherein the object comprises a panel for testing exposure of one or more samples to electromagnetic radiation.

25. The method of claim 23, wherein the object comprises a solar collector or a solar cell.

26. The method of claim 23, wherein the step (a) comprises the step of manually orienting the object with respect to a bearing and a level.

27. The method of claim 23, wherein the step (a) comprises the step of automatically acquiring a bearing and a level of the object.

28. The method of claim 23, wherein the step (a) comprises the steps of acquiring current articulation angles of the object about the first and second axes, and storing the current articulation angles.

29. The method of claim 23, wherein the step (b) comprises the step of receiving the location from a global positioning system device coupled to a processor.

30. The method of claim 23, wherein the step (c) comprises the step of acquiring the time measurement from the global positioning system.

31. The method of claim 23, wherein the step (d) comprises the step of searching ephemeris data.

32. The method of claim 23, wherein the step (d) comprises the step of calculating positions and times of the travel of the sun based on the time measurement and the location of the object on the earth by operating an algorithm on a processor.

33. The method of claim 23, wherein the step (f) comprises the step of operating a first stepper motor to articulate the object about the first axis and operating a second stepper motor to articulate the object about the second axis.

* * * * *